Nov. 20, 1951  C. G. MUENCH  2,575,828
MOBILE MECHANICALLY PROPELLED SPRINKLER
Filed Feb. 25, 1948  3 Sheets-Sheet 1
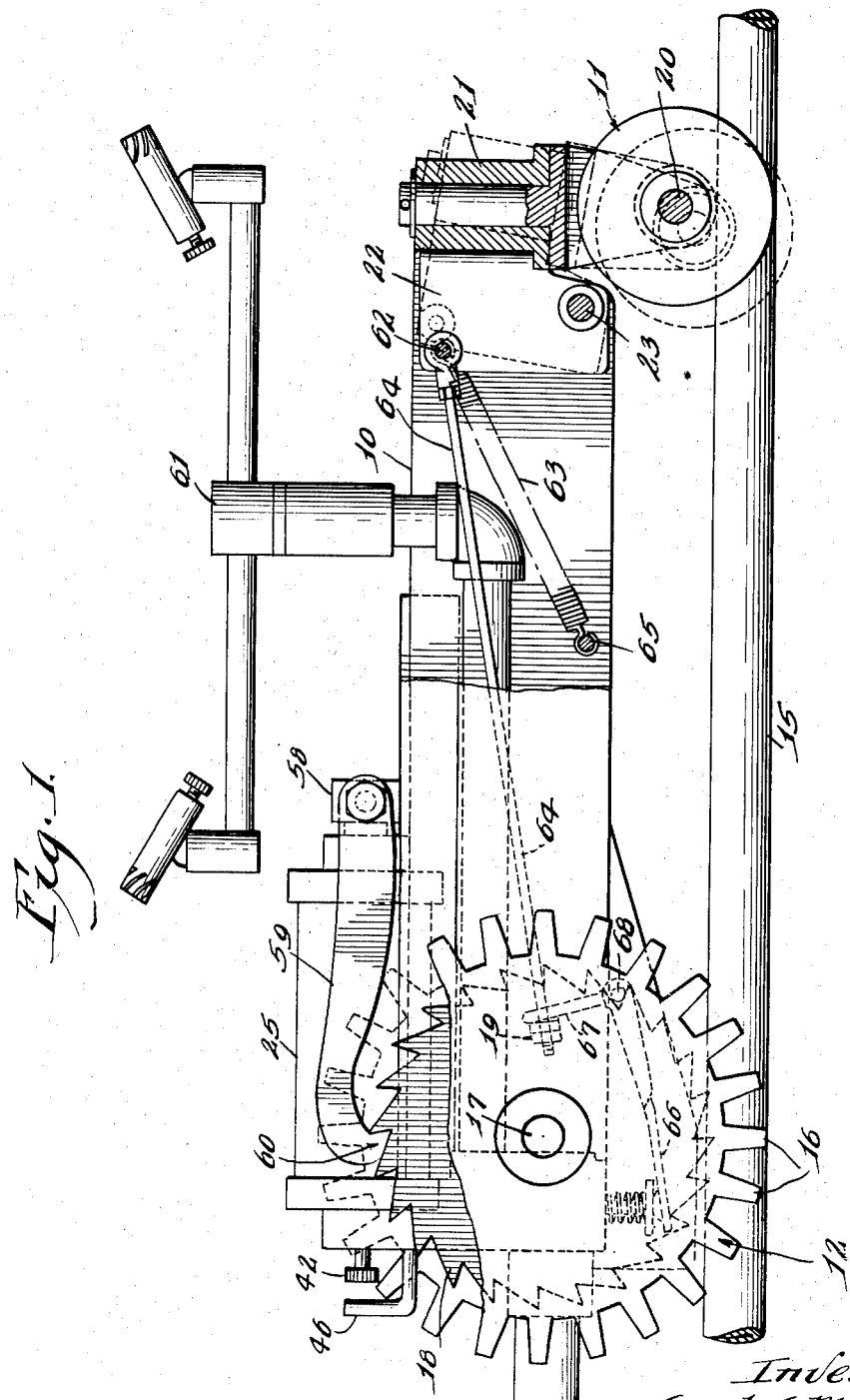
Inventor:
Carl G. Muench
By. Edw A Hampson
Attorney.

Nov. 20, 1951  C. G. MUENCH  2,575,828
MOBILE MECHANICALLY PROPELLED SPRINKLER
Filed Feb. 25, 1948  3 Sheets-Sheet 2
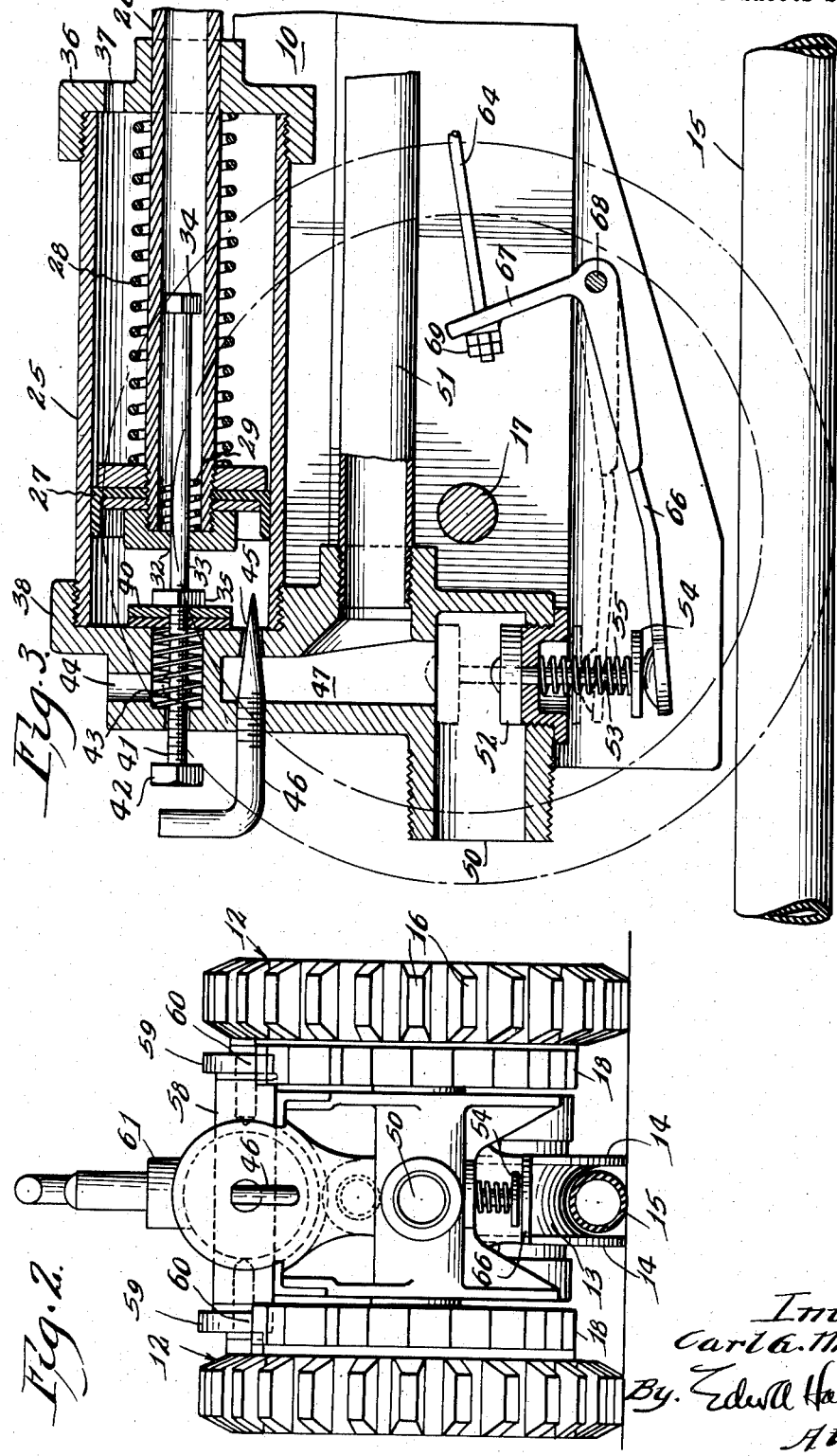

Nov. 20, 1951 C. G. MUENCH 2,575,828
MOBILE MECHANICALLY PROPELLED SPRINKLER
Filed Feb. 25, 1948 3 Sheets-Sheet 3
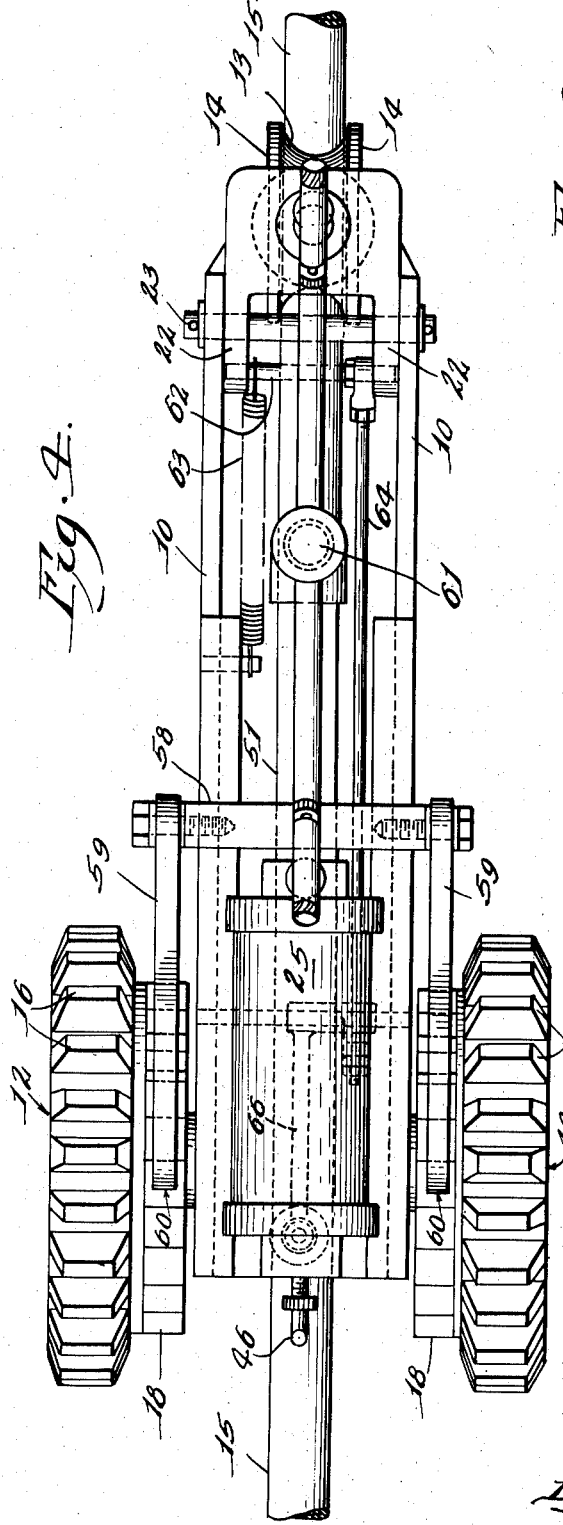
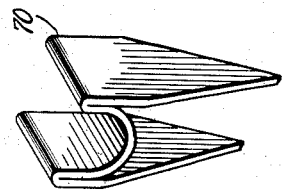
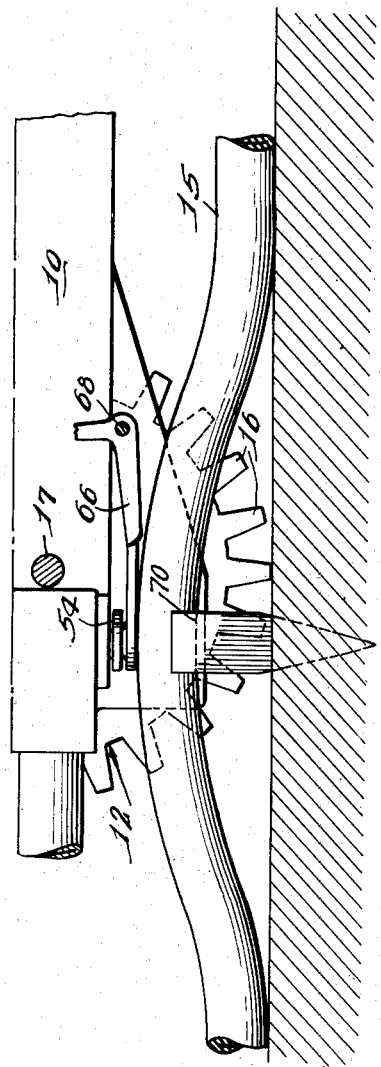
Inventor
Carl G. Muench
By Edw. A. Hampson
Attorney.

Patented Nov. 20, 1951

2,575,828

UNITED STATES PATENT OFFICE 2,575,828

MOBILE MECHANICALLY PROPELLED SPRINKLER

Carl Gebhard Muench, Glenview, Ill.

Application February 25, 1948, Serial No. 10,769

5 Claims. (Cl. 299—49)

This invention concerns a lawn sprinkler which can be described as an automatic lawn sprinkler in that it is so constructed that when its operation is started, it will travel along a predetermined path and will water along such path and, finally, when the end of such defined path is reached, it will automatically stop.

The lawn sprinkler, which will be described in detail, embodies the new and improved features constituting it a most versatile piece of apparatus. Of the improvements in construction and operation, the following is considered as those most outstanding.

Whereas, most sprinkler machines which embody a propelling device have but one speed, or it is necessary to remove and replace a gear wheel with one having a different number of teeth, this machine has a full range of speeds up to its maximum, varied by the simple operation of a needle valve.

The motor which propels the device is supplied independently of the supply to the sprinkler head, and thus adjustment of one does not adversely affect the other.

A spray head is used which may be secured against rotation whereupon, by suitable adjustment of the spray nozzles thereon, stationary sprays may be directed to either or both sides of the path.

The propelling motor may be rendered inactive by cutting off its supply of propelling fluid, and in such case the device serves as a stationary, rotating head sprinkler.

Due to the construction, lubrication is not necessary.

The construction is such that when the device encounters an obstruction, such as a toy left on the lawn, the entire device is automatically shut off.

Any desired type of spray head may be mounted on the tractor since, as above referred to, the operation of the one does not affect the operation of the other.

This machine may be used to water an area along a straight line path or along a curved path, as, for example, it may be set to operate along a straight path and water the lawn along the sides of such path, or, it may be set to follow the curvature of a winding path or a flower bed having a curved perimeter, and in either case the device will follow the predetermined path and suitably water an area along such path, all without attention and other than initial operation.

The automatic watering device hereof is shown in the accompanying drawings wherein, in the various figures thereof, similar parts are designated by the same numerals, and wherein:

Figure 1 is a side elevation with parts broken away to show details of the construction;

Figure 2 is an end elevation;

Figure 3 is a partial longitudinal section substantially along the longitudinal center line of the device;

Figure 4 is a top plan view;

Figure 5 is a side elevation of a fragmentary portion of the device; and

Figure 6 is a perspective view of an accessory.

The automatic watering device hereof comprises, basically, a tractor or carriage on which there is mounted a hydraulic motor and a suitable watering or spray head.

The inventions hereof are primarily with respect to the general assemblage and arrangement of elements of the device, whereby there is provided an improved automatic watering apparatus which will operate along a predetermined path, and will automatically stop when the end of such predetermined path has been reached. A particular object of the invention hereof is the provision of a new and improved sprinkler or waterer which is simple in construction and rugged, and in particular wherein such device, although propelled by a hydraulic motor, has full supply-water pressure supplied to the sprinkler head thereof, whereby the effectiveness of sprinkling is not reduced due to the association therewith of the hydraulic propelling device. Still other further objects of the invention are the improvements of the various details of construction of the device and the general operation thereof.

In the drawings there is shown a tricycle type tractor, or carriage, which comprises an elongated frame portion generally designated by the numeral 10, to which, at the forward end, there is mounted guiding wheel 11, and at the rear end a pair of tractor wheels 12. The guiding wheel 11 is a grooved wheel having a groove 13 and side flanges 14, whereby the groove 13, being formed as substantially a semi-circle, is adapted for positioning over a hose 15, whereby the spaced side flanges 14 of the guide wheel 11 may ride along the sides of the hose 15 and be guided in accordance with the positioning of hose 15 on the ground.

Tractor wheels 12 are provided with suitable lugs 16 or, as will be readily understood, may, if desired, have a cleated rubber tire or the like mounted on its peripheral surface. The specific form of the lugs or the like of tractor wheels 12 is, of course, immaterial, it merely being required that the peripheries of such wheels be provided with such surface or projections, or the like, that these wheels may propel the device forwardly as such tractor wheels are driven by the hydraulic motor, which will be described in more detail.

Tractor wheels 12 are journaled on a shaft 17 which is suitably mounted in the main frame 10, and the tractor wheels have suitably mounted thereon ratchet wheels 18 or the like, whereby, as power is suitably applied to such ratchet wheels, the tractor wheels 12 may be driven to suitably advance the sprinkler device along its predetermined path.

The guide wheel 11 is mounted on a shaft 20 which is mounted in a caster construction, generally designated by the numeral 21, and which is provided with a rearwardly extending portion 22 pivoted at 23, the purpose of which construction will be described in more detail. By the provision of the pivoted caster construction, just above described, it is readily evident that the caster construction or assembly 21 may pivot about 23, and this construction is provided for the purpose of shutting off the supply to the sprinkler device should it, in following its path, meet some adventitious obstacle, and it may also be utilized for shutting off the device when it reaches the extremity of travel along its predetermined path.

Suitably mounted on the main frame 10 there is provided a hydraulic motor designated generally by numeral 25, and which, without referring to any detail, comprises cylinder heads and a piston mounted for reciprocation in the cylinder. A piston rod 26 is mounted in the hydraulic cylinder and carries piston 27. Surrounding the piston 26 there is provided a spring 28 which, after piston 27 has traveled to its outer limit of movement, and upon opening of the cylinder exhaust valve, serves to return piston 27 to the inner end of its stroke. Piston rod 26 is hollow, and spring 29 is provided therein at its inner end, that is, at the end adjacent the piston 27. The piston rod, at its inner end, is provided with an opening 32 in its head, and in which there is mounted valve operating plunger 33 provided with an enlarged head on each end thereof, the such heads being designated by numerals 34 and 35.

In the outer head 36 of motor 25 there is provided a vent opening 37, and in the inner cylinder head 38 there is suitably mounted an exhaust valve 40 having a stem 41, which is actually a part of or is connected to valve operating plunger 33, there being provided on the outer end of stem 41 a head 42. Surrounding the exhaust valve stem 41 there is suitably mounted a spring 43 which is so mounted as to continuously urge exhaust valve 40 to open 30 position. The exhaust valve spring 43 is mounted in a suitable recess in head 38, and by way of port 44 communicates with the atmosphere, the such port 44 constituting the exhaust port of the motor.

Also provided in motor head 38 there is a valved opening 45 which is controlled by means of an adjustable needle valve 46. Finally, in the head 38 there is provided a fluid supply passage 47 through which fluid is supplied to motor 25, as will be hereinafter more fully set out.

Also, as part of the motor head 38, there is provided the main fluid inlet of the device, such being designated by numeral 50 which opens into motor fluid supply channel 47, and from which pipe 51 extends to the sprinkler which is mounted on the main frame.

In head 38 there is further provided a shut-off valve suitably mounted for controlling the supply of fluid to the device and which, when closed, cuts off the flow of fluid from the main inlet 50 so that fluid is not supplied to either the motor supply channel 47 or the sprinkler supply pipe 51. The valve just above referred to comprises a supply valve head 52 mounted on one end of valve stem 53, and on the other end of which there is mounted a tappet head 54. Spring 55 surrounds valve stem 53 and is so mounted between a portion of the motor head 38 and valve tappet 54 that the spring biases the valve to open position.

The operation of the hydraulic motor is that by means of a hose connected to the main fluid inlet 50, water under pressure is supplied thereto, flowing thence into motor fluid supply channel 47, through needle valve opening 45 under control of needle valve 46, and into the inner end of the motor cylinder.

Assuming that the motor is just ready to be started up, and with the water pressure cut off, then, due to the action spring 28, the motor piston 27 will be at the inner end of its stroke, and this will have forced the exhaust valve 40 to closed position due to the cap on the inner end of piston rod 26 contacting nut like member 35 on valve operating plunger 33. Now when pressure fluid is admitted to the inner end of the motor cylinder, the exhaust valve being closed, pressure will be exerted upon the inner face of the piston, and piston 27 will be projected outwardly until it reaches the end of its stroke, whereupon, as it approaches the end of its stroke, spring 29 will be compressed by head 34 of the plunger until such spring overcomes the differential fluid pressure exerted on valve 40, whereupon valve 40 will be lifted from its seat. As soon as valve 40 is lifted from its seat, the pressure fluid in the cylinder begins to exhaust and flows out through motor exhaust port 44 and the pressure being released, spring 28 again returns the piston and piston rod to the inner end of its stroke and valve 40 is again closed, as above referred to.

From the foregoing it will be seen that the fluid supply divides and is supplied at full pressure to both the motor and to the sprinkler head. That is, there is no diminution of fluid pressure supplied to the sprinkler dead due to such having first passed through the motor to operate it to provide the power for moving the watering device.

On the outer end of piston rod 26 there is mounted a cross head 58 to the ends of which are pivoted detent levers 59 having a hook-like configuration at their other ends, designated by the numeral 60, and which are adapted to cooperate with the teeth on ratchet wheels 18.

From the foregoing it is believed to be clearly apparent that when water is supplied to the motor of the device, the piston will be caused to reciprocate, and through the reciprocation of the piston, the detents will be reciprocated. As the detents are reciprocated, their outer ends 60, engaging the teeth of ratchet wheels 18, drive such wheels forwardly as the piston moves outwardly in its stroke, and as the piston moves rearwardly or inwardly in its stroke, the detents, due to the fact that they are pivoted, move backwardly and idly so that as the piston reciprocates the entire device will be moved forwardly due to step-by-step rotation imparted to the ratchet wheels which, as previously described, are mounted to the tractor wheels, and consequently the device will be advanced forwardly by a step-by-step movement.

Sprinkler supply pipe 51 extends forwardly and then upwardly, and there is mounted thereon any suitable type of rotating sprinkler head, an embodiment of which has been shown in the drawings and generally designated by numeral 61. Such sprinkler head is preferably one which can be secured against rotation and which is provided with more or less universally mounted spray heads which are preferably adjustable as to type of spray. These features just referred to not being specifically of the essence of the invention hereof, and such devices being readily available on the market, they will not be described in further detail, since such are well known to those skilled in the art involved.

The rear extension 22 of caster construction 21 is provided with a pin 62 on which there is mounted a spring 63 and a pull rod 64, the other end of the spring being mounted on a pin 65 provided on main frame 10. The pull rod 64 extends rearwardly from its pivot point, and the outer end thereof serves to operate the main shut-off valve, as will be described. The main shut-off valve 52 of the device, which normally is held in open position by the action of spring 53, may be closed by exerting a closing force to its tappet head 54. Such valve closing force is applied by means of a crank, the arms of which are designated by the numerals 66 and 67, respectively, and which crank is pivoted at the intersection of its arms 66 and 67 on pivots 68 which is mounted on the main frame 10. Crank arm 67, at its outer end, is provided with a suitable slot through which extends the outer end of pull rod 64, such operating freely through such suitable opening in arm 67, but is prevented from pulling therethrough by suitable stop 69 mounted adjacent the end of such pull rod 64. It will be understood that as pull rod 64 may move rearwardly, it may move freely through the opening in crank arm 67, but that when the pull arm goes forwardly, the stop 69 will contact a face of the crank arm 67 to pull this arm forwardly and accordingly move crank arm 66 upwardly. As crank arm 66 moves upwardly, it will act on supply valve tappet head 54 and force valve head 52 to closed position, as is shown in dotted lines.

The operation of the device, as has been described, is as follows: Assuming the supply valve to be open, when fluid pressure is supplied the motor will be reciprocated, and this in turn will, as described, cause the tractor wheels to be revolved, step-by-step, and thus move the device forwardly step-by-step. At the same time, fluid under pressure is supplied to the watering head and the device will water an area about the point where the device is positioned. A flexible guide member 15, which is conveniently a piece of hose, is laid out to define the path which it is desired that the sprinkler shall follow. The device is set down over the guide member with the groove of the guide wheel 13 positioned on the guide means 15, and as the device moves forwardly step by step, it will follow a path along guide means 15 in a straight line or in an irregular path, in accordance with the manner in which such guide member 15 has been laid out.

It it to be understood, of course, that the sprinkling device does not move forward endlessly, but that means must be provided for discontinuing its operation, either automatically or manually, and to stop the operation of the device at any point it is only necessary to either raise the guide means 15 at some point, as is shown in Figure 5, as by placing thereunder a stirrup means, such as 70, or to place along the guide means 15 any sort of obstruction at the point at which it is desired to stop the operation of the sprinkler. In the one case, that is when a device such as stirrup 70 is employed to raise the guide means 15, the guide means itself constitutes the device for shutting off operation of the sprinkler. Where the guide means 15 is raised, forward movement of the sprinkler device at this point causes crank arm 66 to ride up on the raised portion and to force valve 52 to closed position, which stops the operation of the sprinkler by closing off the supply of pressure fluid. On the other hand, should the device meet an obstruction along guide means 15, or should any force be applied to guide wheel 11 which will cause it to pivot on its pivot 23 against the pull of spring 63, such pivotal movement will cause the pull arm 64 to move forwardly, whereupon stop 69 on the end thereof will act on crank arm 67 to cause pivotal movement of crank arm 66, which also has the effect of forcing the main valve 52 to closed position and thus shutting off the sprinkler device.

From the foregoing description it will be seen that the sprinkler device hereof is one of versatile use. That is, it may be used to sprinkle a large area along a defined path or, by closing needle valve 46, it may be used as a stationary sprinkler, and that in either case large areas may be covered by the sprinkling since the fluid supply is supplied at full pressure directly to the sprinkler head without loss due to its first having passed through a hydraulic motor for propelling the device.

The invention hereof and its mode of operation having been herein set out in complete detail, I claim:

1. A mobile sprinkler comprising an elongated supporting frame, a guiding member mounted to the frame adjacent an end thereof, ground contacting propelling means mounted thereto adjacent the other end thereof, hydraulic power means mounted on the frame, driving means conveying power from the power means and driving the propelling means, and a sprinkler head mounted on the frame; a branched fluid supply conduit also mounted on the frame, a branch thereof connecting to the sprinkler head and another branch thereof connecting to the hydraulic power means, there being interposed in the latter branch adjustable valve means varying the flow thereto by suitable adjustment, a shut-off valve interposed in the fluid supply conduit, the guiding member pivotally mounted to the frame and operating means interposed between the guiding member and shut-off valve, whereby upon tilting of the guiding member upon its pivot the shut-off valve is operated to consequently cut off the flow of hydraulic fluid through the fluid supply conduit.

2. The device defined in claim 1 in combination with an elongated guide means positioned on the ground, the sprinkler guiding member having a portion straddling such elongated guide means and guided thereby.

3. The device defined in claim 1 wherein the hydraulic power means comprises a reciprocating piston, reciprocating in a cylinder, a piston rod secured to the piston, a pivoted detent mounted to the piston and a toothed driving means mounted to the ground contacting propelling means, the pivoted detent being in operative relation to the toothed driving means and intermittently thereby rotating the such propelling means in one direction to advance the device forwardly step-by-step.

4. Apparatus in operative combination comprising a mechanically propelled mobile sprinkler, an elongated guide means along which the sprinkler travels, the elongated guide member flexible and capable of substantially conforming to the ordinary lawn contour, the sprinkler having a shut off valve structure and means interposed in the guided path of the sprinkler under the guide means and locally elevating a portion thereof, the elevated portion of the guide means operatively contacting the shut off valve structure and serving to cause the shut off valve to operate from open to closed position.

5. In a wheeled device, comprising a frame, a shut off device and supporting wheels mounted thereon and means operating the shut off device operatively connecting a supporting wheel and the shut off device, and wherein a supporting wheel is pivoted to a rocker frame, the rocker frame is in turn pivotally mounted to the frame, a tensioned spring is mounted at one end to the frame and its other end to the rocker frame and biasing the rocker frame to normal operating position, and means provided on the rocker frame mounting the means for operating the shut off device.

CARL GEBHARD MUENCH.

REFERENCES CITED

The following references are of record in the file of this patent:

UNITED STATES PATENTS

| Number | Name | Date |
|---|---|---|
| 484,294 | Carlson | Oct. 11, 1892 |
| 1,106,783 | Clay | Aug. 11, 1914 |
| 1,223,246 | Bohnenkemper | Apr. 17, 1917 |
| 1,293,485 | Liberman | Feb. 4, 1919 |
| 1,389,488 | Cholick | Aug. 30, 1921 |
| 1,427,916 | Sheinker | Sept. 5, 1922 |
| 1,658,202 | Jones | Feb. 7, 1928 |
| 1,714,713 | Farley | May 28, 1929 |
| 2,057,217 | Soper | Oct. 13, 1936 |
| 2,228,428 | Wilson | Jan. 14, 1941 |
| 2,249,211 | Johnson | July 15, 1941 |
| 2,395,253 | Covey | Feb. 19, 1946 |